Feb. 12, 1957   W. TYDON   2,781,226
CARGO VEHICLE BODY WITH FOLDABLE DOORS FOR
IMPARTING A STREAMLINED SHAPE TO THE BODY
Filed June 25, 1953   2 Sheets-Sheet 1

INVENTOR.
WALTER TYDON
BY
ATTORNEYS

Feb. 12, 1957 W. TYDON 2,781,226
CARGO VEHICLE BODY WITH FOLDABLE DOORS FOR
IMPARTING A STREAMLINED SHAPE TO THE BODY
Filed June 25, 1953 2 Sheets-Sheet 2
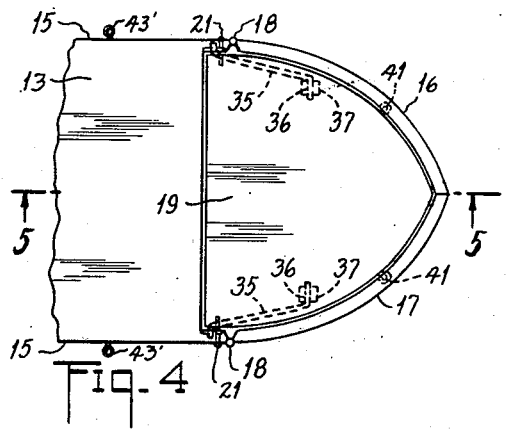
Fig. 4
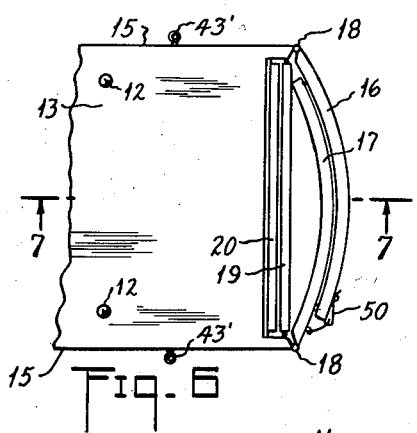
Fig. 6
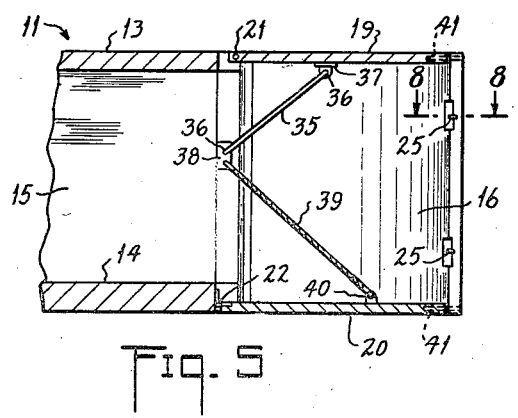
Fig. 5
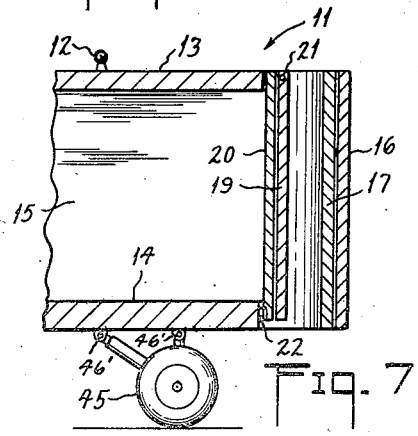
Fig. 7
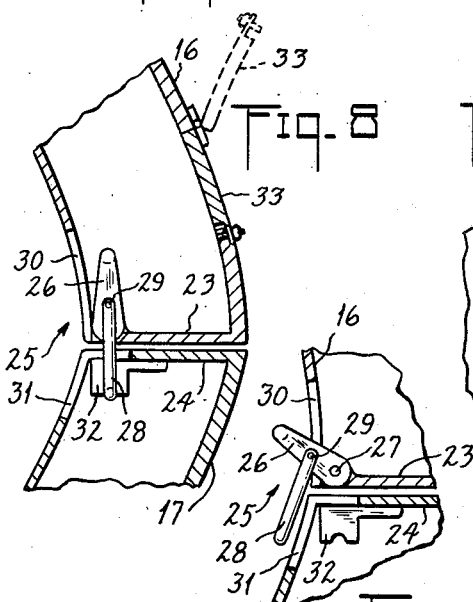
Fig. 8
Fig. 9
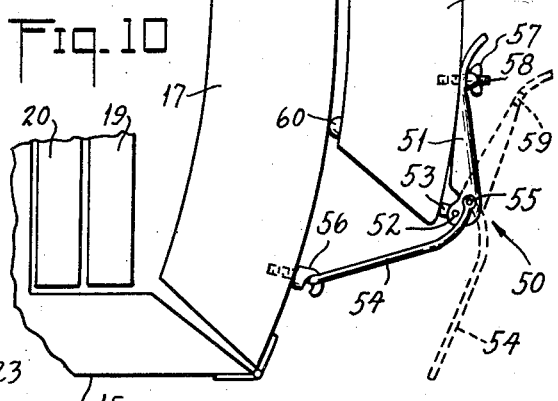
Fig. 10
INVENTOR.
WALTER TYDON
BY
Campbell Brumbaugh Free Graves
ATTORNEYS United States Patent Office 2,781,226
Patented Feb. 12, 1957

2,781,226

CARGO VEHICLE BODY WITH FOLDABLE DOORS FOR IMPARTING A STREAMLINED SHAPE TO THE BODY

Walter Tydon, Hagerstown, Md., assignor to Fairchild Engine and Airplane Corporation, Hagerstown, Md., a corporation of Maryland Application June 25, 1953, Serial No. 364,026

8 Claims. (Cl. 296—28)

This invention relates to cargo vehicle bodies, and has particular reference to a detachable aircraft fuselage or cargo pack which is convertible into a highway vehicle.

One of the desirable features in a detachable fuselage aircraft is the ability to load and unload the detachable cargo fuselage or pack through openings at each end which should preferably be as large as the maximum cross-section of the cargo space or at least as wide as the cargo space. Such large openings, however, require large and bulky doors which must be of streamline shape to reduce aerodynamic drag when the pack is airborne. For highway travel, air drag is unimportant, but maneuverability and length are of great importance, and the optimum design for highway travel is a rectangular box-like structure, all of the interior of which space is usable for cargo storage and which is free of the streamlining desirable in air transportation use but which produce front and rear projections serving no useful purpose on the ground and inordinately increasing the overall length of the vehicle.

In accordance with the present invention, an elongated box-like detachable cargo pack for aircraft is provided having its front and rear ends of streamline shape to reduce aerodynamic drag in flight and capable of being collapsed into blunt ends for highway service to thereby materially reduce the overall length of the pack and render it more maneuverable on the road.

In a preferred embodiment of the invention, a rectangular box-like body having open front and rear ends is fitted with doors hinged at opposite vertical sides of each opening and having a horizontal swinging width approximately equal to the width of the body, so that when the free vertical edges of the doors are brought into contact, the doors cooperate to form a V-shaped projection on each end of the body as seen in plan. These end doors are also arranged to be folded flatwise over each other to close the corresponding open end of the body, thereby affording substantially flat front and rear ends therefor and at the same time, materially decreasing the overall length of the body as compared to its streamlined length. Filler plates of generally triangular shape are hinged to the floor and roof at opposite ends of the body to fold horizontally and thus become extensions of the floor and roof and close the corresponding triangular spaces between the doors when they are positioned to form the streamlined front and rear ends of the body for airborne use. These upper and lower filler plates are arranged to be folded respectively downwardly and upwardly when the streamlined ends are collapsed into the blunt-ended body for highway service. Suitable locking and bracing means for securing the doors and filler plates in both streamlined and blunt-ended arrangements are provided, as well as mechanism for effecting their movements into both alternative positions. The body is provided either with wheels, which may be retractable or removable when the body is airborne, but which enable the body to be drawn along the highway by a tractor, truck, or powered dolly.

It will be seen that the cargo vehicle body of this invention is readily and simply converted into a streamlined form for airborne use and into shortened, blunt-ended form for highway use, by means of foldable self-contained parts which do not detract from the usable cargo space and afford the double-ended loading and unloading facility that is so desirable for both airborne cargo pack and highway service.

For a more complete understanding of the invention, reference may be had to the accompanying drawings, in which:

Fig. 4 is an enlarged plan view of one end of the body arranged for air cargo service, and showing the loading doors in streamline position;

Fig. 5 is a longitudinal section therethrough, as seen along the line 5—5 of Fig. 4;

Fig. 6 is an enlarged plan view of one end of the body arranged for highway service, and showing the loading doors folded substantially flatwise to shorten the overall length of the body;

Fig. 7 is a longitudinal section therethrough, as seen along the line 7—7 of Fig. 6;

Figs. 8 and 9 are enlarged horizontal sections through the end doors as seen along the line 8—8 of Fig. 5 and showing one of the door locking toggle latches in closed and open positions respectively;

Fig. 10 is an enlarged fragmentary plan view of the doors in flatwise folded position and showing the toggle latch in closed (solid lines) and open (dotted lines) positions.

Figure 1:
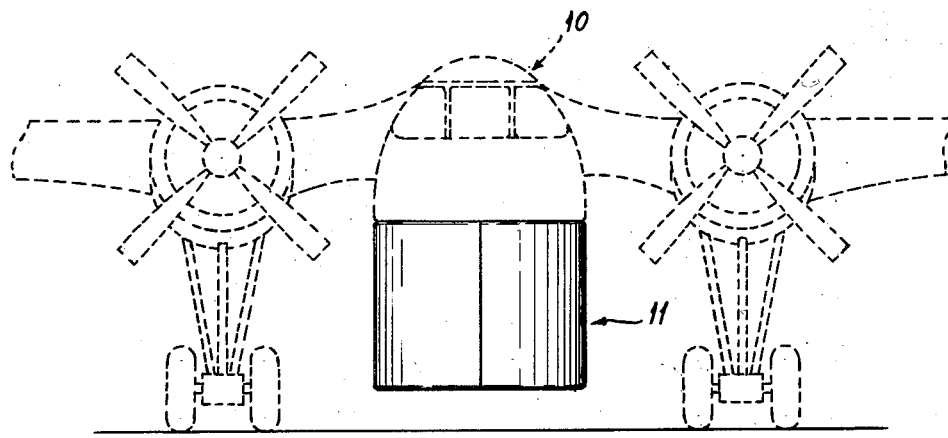
Figure 1 is a nose or forward end view of the vehicle body of this invention shown mounted as a cargo pack on the flyaway airframe of the carrying aircraft, shown in phantom.

Referring to Fig. 1 of the drawings, numeral 10 designates a basic airplane especially adapted to carry a cargo body 11 which is detachable therefrom in a known manner forming no part of the present invention, although the detachable and detached cargo body 11 embodies the present invention.

Figure 2:
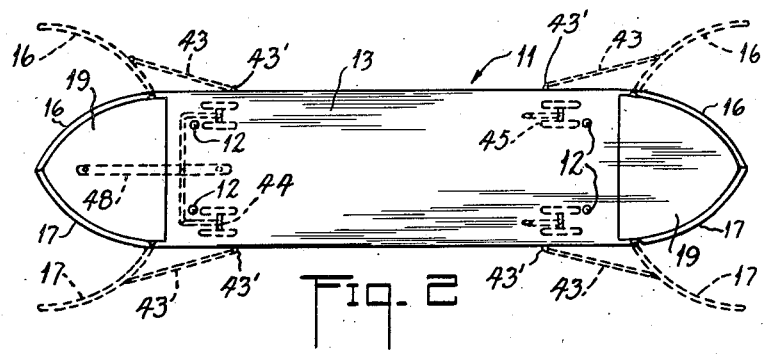
Fig. 2 is a plan view of the cargo body arranged for airborne use with its loading doors shown in open position.
Figure 3:
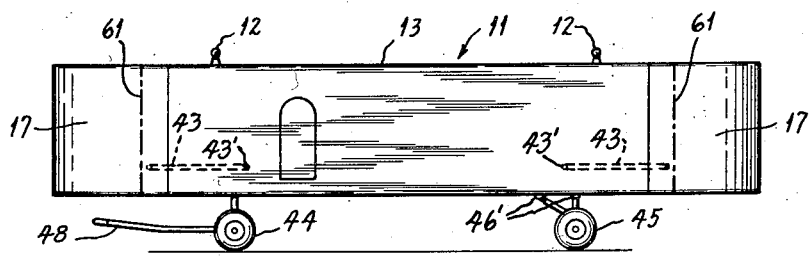
Fig. 3 is a side elevation thereof.

The releasable interconnecting mechanism between the cargo body and the aircraft 10 may include ball type fittings 12 on the roof 13 of the body 11 shown in Figs. 2 and 3 and adapted to be received in mating sockets in the undersurface of the aircraft 10, for example.

As shown particularly in Figs. 5 and 7, the rectangular body 11 comprises roof 13, floor 14 and side walls 15 with both ends open except for closure doors to be described. The body 11 is of light but strong construction, preferably fabricated of aluminum or magnesium alloys in accordance with aircraft structural practice. Fittings 12 and other high strength units are made of steel.

When the body 11 is to be airborne, each open end thereof is closed by four cooperating parts, namely, two doors 16 and 17 secured by vertical hinges 18 to the body sides 15, and upper and lower filler plates 19 and 20, respectively, hinged about horizontal pivots 21 and 22 to the ends of the roof 13 and floor 14. The doors 16 and 17 are preferably bowed outwardly to fair into the surface of the side walls 15 and present a smooth streamline surface when their free vertical edges engage in abutment, as shown in Figs. 2 and 4.

The abutting vertical edges of the doors 16 and 17 are provided with flat abutment plates 23 and 24 and, as shown especially in Figs. 8 and 9, are secured in such abutting relation by toggle latches 25. These latches 25 each comprise a handle 26 pivoted about a pin 27 mounted on the inner surface of plate 23 and carrying a bail 28 pivoted off-center thereof about pin 29 so as to be swingable through the opening formed jointly by slots 30 and 31 in the inner panel of doors 16 and 17, respectively, as shown in Fig. 8. Bail 28 is adapted to cooperate with a groove saddle 32 secured to the inner surface of plate 24 of door 17. When bail 28 is placed in saddle 32 and handle 26 swung from the position shown in Fig. 9 to that of Fig. 8, the resulting toggle action latches doors 16 and 17 securely together in the position shown in Figs. 2 and 4. A hand hole normally closed by hinged panel 33 is provided in the outer surface of door 16 for exterior access to each latch 25 of which there may be two or more.

The filler plates 19 and 20 have contours in plane corresponding to the interior shape of the doors 16 and 17 when closed, so as to fill the horizontal spaces between them and the ends of the roof 13 and floor 14, as shown in Figs. 2 and 4. The upper filler plate, hinged about horizontal pivots 21 as described, is normally held in horizontal position by brace rods 35 comprising tubes having angular pins 36 at each end adapted to be removably inserted in socket fittings 37 and 38, respectively, mounted on the surfaces of opposite walls 15 and the under surface of filler plate 19 at each end of the body 11, as shown in Figs. 4 and 5.

Similarly, each lower filler plate 20, hinged to the floor end by hinge 22 as described, is held at each side in normal horizontal position by a cable 39, removably connected at its upper end to fitting 38 and at its lower end in an eye bracket 40 mounted on the upper surface of lower filler plate 20, as particularly shown in Figs. 4 and 5. In addition to the braces 35 and cables 39, the plates 19 and 20 are secured to the doors 16 and 17 by fixed pins 41 extending from the edges of the filler plates 19 and 20 and engaging aligned holes in the inner surfaces of doors 16 and 17, as shown in Figs. 4 and 5. Accordingly, by means of latches 25, braces 35, cables 39 and pins 41, the doors 16 and 17 and the upper and lower filler plates 19 and 20 are securely locked together to form streamline front and rear ends for the body 11 for airborne service.

In order to hold doors 16 and 17 open during loading and unloading, a pair of spreader bars 43, having standard eye bolt terminals at each of the ends, engage similar eye bolts in the sides of the body 11 and the doors 16 and 17 and are held in position by removable pins passing through aligned eye bolts 43'. Spreader bars 43 and brace tubes 35 are stowed within the body 11 when not in use.

Figure 11:
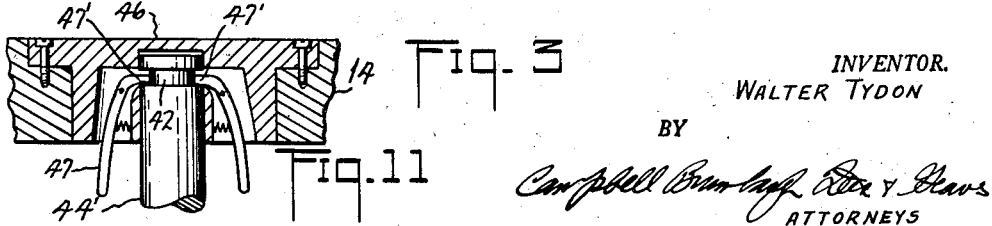
Fig. 11 is an enlarged detail of the wheel connection in the floor of the body.

When the body 11 is to be rendered roadable and while it is still suspended from the pack plane 10, the front wheel assembly 44 is emplaced under the body 11 by inserting the three uprights 44' into socket fittings 46 provided therefor in floor 14, as shown in Fig. 2. The uprights 44' are free to swivel in their socket fittings 46 and are retained therein by spring-pressed levers 47 having fingers 47' engaging groove 42 in the upright 44 as shown in Fig. 11. By pressing the lower ends of the levers 47 inwardly, their fingers 47' disengage groove 42 and release the corresponding uprights from their socket fitting 46.

The front wheel set 44 is steerable and is provided with a hauling tongue 48 for attachment to a tractor, although the front wheel set 44 may be omitted and the front end of the body 11 may be seated in the saddle of a dolly truck and connected thereto by a king pin, in accordance with common practice. The rear wheel set 45 is placed under the aft end of the body 11 and bolted to lug fittings 46' provided on the bottom 14, as show in Fig. 7. When the wheel sets 44 and 45, including their built-in spring and shock absorbers, are not in use, they may be stowed in body 11. Alternatively, the wheels 44 and 45 may be retractable landing gear contained in wells during flight.

After the wheel sets 44 and 45 are emplaced as described, the body 11 is released from the pack plane 10 and prepared for highway service by collapsing the front and rear streamline ends to reduce the length of the body 11 and render it more maneuverable as a highway vehicle. To this end, the latches 25 are released as shown in Fig. 9, and the doors 16 and 17 swung open. Then lower filler plate 20 is raised about its hinge 22 to the vertical position shown in Figs. 6, 7 and 10. The braces 35 are removed and top filler plate 19 dropped about its pivots 21 to overlap plate 19, pivots 21 being spaced outwardly to allow such overlap, as shown in Figs. 6, 7 and 10. Doors 16 and 17 are then swung inwardly about their hinges 18, the latter first to overlie plate 19 and then door 16 next to overlie door 17 as shown in Figs. 6, 7 and 10.

The doors 16 and 17 are maintained in folded position for highway travel by a toggle latch mechanism 50 shown in detail in Fig. 10. A manually operable lever 51 is pivoted about a pin 52 on a fitting 53 on the outer surface of the door 16 to swing between the positions shown in solid lines and broken lines. A U-shaped clasp member 54 is pivoted at its open end on the lever 51 about pin 55 and engages at its closed end a hook fitting 56 attached to the outer face of the door 17. As a safety measure, the toggle lock may be held in the closed position by a wing nut 57 engaging a stud bolt 58 in door 16 and passes through a hole 59 in the face of lever 51. A plurality of rubber bumpers 60 may be provided along the inner edge of door 16 to prevent damage to the door surface from abrasive action.

The operation of the cargo vehicle body and its conversion from use in airborne service to highway service, and vice versa, will be readily understood from the foregoing description. By means of the invention, an aerodynamic unit may be converted into a highway unit quickly and simply and hence has the advantages of both by removing the disadvantage of the airborne unit of over-length and difficult maneuverability on the road and the blunt end disadvantage of the highway unit of low aerodynamic efficiency. As an example, a typical unit has an overall length of forty-three feet when its streamline front and rear ends are extended for airborne use, and when the ends are collapsed in the manner described, the overall length of the body is reduced to thirty-two feet, or a length reduction of eleven feet, which is indicated graphically by the dot-and-dash lines 61 in Fig. 3.

Although a preferred embodiment of the invention has been illustrated and described herein, it is to be understood that the invention is not limited thereby, but is susceptible of changes in form and detail within the scope of the appended claims.

I claim:

1. In a cargo vehicle, the combination of an elongated hollow body of substantially tubular cross-section, and having at least one end open, a plurality of members hinged to said body at the sides of said open end thereof adjacent the open end thereof and extending substantially around its entire periphery, said members having a length in excess of one-half the width of said open end, means for securing said members with their free edges in abutting relation to close the open end of the body and form an extension thereon of substantially V-shaped contour, and means for securing said doors in overlapping relation to close the said open end of said body and decrease the overall length of said body.

2. In a cargo vehicle, the combination of an elongated hollow body of substantially tubular cross-section, and having at least one end open, doors hinged to said body at opposite sides of said open end thereof, said doors having a width in excess of one-half the width of said open end, means for securing the free edges of said doors in abutting relation to provide a substantially V-shaped contour for the corresponding end of said body, substantially V-shaped extensions pivotally mounted on said body for substantially closing the space formed between the body and the upper edges of said doors and the space between the body and the lower edges of said doors when secured in said free edge-abutting relation, and means for securing said doors and extensions in overlapping relation to close the said open end of said body, whereby the overall length of said body is decreased.

3. In a cargo vehicle, the combination of an elongated hollow body of substantially tubular cross-section, and having opposite sides, roof and floor and at least one end open, doors hinged to said body at two opposite sides of said open end thereof, said doors having a width in excess of one-half the width of said open end, means for securing the free edges of said doors in abutting relation to provide a substantially V-shaped contour for the corresponding end of said body, substantially V-shaped extensions pivoted on the roof and floor of said body for substantially closing the spaces formed between the roof and the upper edges of the doors and between the floor and the lower edges, said doors when secured in said free edge-abutting relation and substantially closing said open end upon overlapping movement to vertical position about said pivots, means for locking said V-shaped extensions in extended position, and means for securing said doors in overlapping relation over said extensions in said vertical position to further close the said open end of said body, whereby the overall length of said body is decreased.

4. In a cargo vehicle, the combination of an elongated hollow body of substantially rectangular cross-section, and having at least one end open, doors hinged to said body at two opposite sides of said open end thereof, said doors having a width in excess of one-half the width of said open end and not substantially exceeding the width of said open end, means for securing the free edges of said doors in abutting relation to provide a substantially V-shaped contour for the corresponding end of said body, substantially V-shaped horizontal extensions on said body for substantially closing the spaces formed between the top of the body and the upper edges of said doors and the bottom of the body and the lower edges of said doors when secured in said free edge-abutting relation, and means for securing said doors in overlapping relation to close the said open end of said body, whereby the overall length of said body is decreased.

5. In a cargo vehicle, the combination of an elongated hollow body of substantially rectangular cross-section, and having opposite sides, roof and floor and at least one end open, doors hinged to said body at two opposite sides of said open end thereof, said doors having a width in excess of one-half the width of said open end, means for securing the free edges of said doors in abutting relaion to provide a substantially V-shaped contour for the corresponding end of said body, substantially V-shaped extensions pivoted on the roof and floor of said body for substantially closing the space formed between the roof and the upper edges of said doors and the space between the floor and the bottom edges of said doors when secured in said free edge-abutting relation and substantially closing said open end upon overlapping movement to vertical position about said pivots, means for locking said V-shaped extensions in horizontally extended position, and means for securing said doors in overlapping relation over said extensions in said vertical position to further close the said open end of said body, whereby the overall length of said body is decreased.

6. In a cargo vehicle, the combination of an elongated hollow body of substantially rectangular cross-section, and having opposite sides, roof and floor and at least one end open, doors hinged to said body at two opposite sides of said open end thereof, said doors having a width in excess of one-half the width of said open end, means for securing the free edges of said doors in abutting relation to provide a substantially V-shaped contour for the corresponding end of said body, substantially V-shaped extensions pivoted on the roof and floor of said body for substantially closing the space formed between the roof and the upper edges of said doors and the space between the floor and the bottom edges of said doors when secured in said free edge-abutting relation and substantially closing said open end upon overlapping movement to vertical position about said pivots, means on said doors for locking said V-shaped extensions in extended position, and means for securing said doors in overlapping relation over said extensions in said vertical position to further close the said open end of said body, whereby the overall length of said body is decreased.

7. In a cargo vehicle, the combination of an elongated hollow body of substantially rectangular cross-section, and having opposite sides, roof and floor and at least one end open, doors hinged to said body at two opposite sides of said open end thereof, said doors having a width in excess of one-half the width of said open end, means for securing the free edges of said doors in abutting relation to provide a substantially V-shaped contour for the corresponding end of said body, substantially V-shaped extensions pivoted on the roof and floor of said body for substantially closing the space formed between the roof and the upper edges of said doors and the space between the floor and the bottom edges of said doors when secured in said free edge-abutting relation and substantially closing said open end upon overlapping movement to vertical position about said pivots, means on said body and connected to said respective V-shaped extensions for locking said V-shaped extensions in horizontally extended position, and means for securing said doors in overlapping relation over said extensions in said vertical position to further close the said open end of said body, whereby the overall length of said body is decreased.

8. In a detachable cargo fuselage for aircraft, the combination of an elongated hollow body of substantially rectangular cross-section, and having its front and rear ends open, doors hinged at opposite vertical sides of the open end of said body and each having a horizontal width greater than one-half the width of the correspondnig open end of the body, means normally securing the free vertical edges of said doors in abutting relation to afford a generally V-shaped streamline contour to the front and rear ends of said body, substantially V-shaped filler plates hinged to the upper and lower horizontal edges of the open end of the body and substantially filling the V-shaped space formed between said doors, releasable means on said body securing said filler plates in normally horizontally extended position, releasable mechanism interposed between said body and the aircraft for detaching the body from the aircraft, wheels on said body for supporting the same on the ground upon detachment from said aircraft, and means for locking said doors in overlapping relation over said filler plates swung to vertical overlapping relation upon release of said releasable means, whereby the overall length of said body is materially decreased for use as a ground vehicle.

References Cited in the file of this patent

UNITED STATES PATENTS

| | | |
|---|---|---|
| 609,789 | Capewell | Aug. 30, 1898 |
| 780,214 | Monnier | Jan. 17, 1905 |
| 2,181,844 | Winters | Nov. 28, 1939 |
| 2,498,906 | Apperson | Feb. 28, 1950 |
| 2,577,287 | Sullivan | Dec. 4, 1951 |
| 2,626,832 | Guthoerl | Jan. 27, 1953 |